United States Patent
Sakae

(10) Patent No.: US 8,485,312 B2
(45) Date of Patent: Jul. 16, 2013

(54) EXHAUST PIPE

(75) Inventor: Akira Sakae, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/579,300

(22) PCT Filed: Feb. 18, 2011

(86) PCT No.: PCT/JP2011/053576
§ 371 (c)(1),
(2), (4) Date: Aug. 16, 2012

(87) PCT Pub. No.: WO2011/105304
PCT Pub. Date: Sep. 1, 2011

(65) Prior Publication Data
US 2012/0312630 A1     Dec. 13, 2012

(30) Foreign Application Priority Data

Feb. 23, 2010  (JP) ................................. 2010-037559

(51) Int. Cl.
*F01N 1/02*    (2006.01)

(52) U.S. Cl.
USPC ............................ 181/249; 181/228; 181/212

(58) Field of Classification Search
USPC ......................................... 181/228, 212, 249
See application file for complete search history.

(56) References Cited

U.S. PATENT DOCUMENTS 4,356,885 A * 11/1982 Dello ............................ 181/227
4,410,013 A * 10/1983 Sasaki et al. .................. 138/149
4,413,657 A * 11/1983 Sasaki et al. .................. 138/149
4,744,440 A *  5/1988 Hanson ......................... 181/227
5,054,185 A * 10/1991 Usui et al. .................... 29/455.1
5,253,680 A   10/1993 Matsumoto
5,907,134 A *  5/1999 Nording et al. ............... 181/228
6,408,980 B1 *  6/2002 Dooley ......................... 181/228
6,648,099 B2 * 11/2003 Dooley ......................... 181/228
2002/0050419 A1 *  5/2002 Dooley ......................... 181/228

FOREIGN PATENT DOCUMENTS

| JP | 57 51083 | 3/1982 |
| JP | 2 180400 | 7/1990 |
| JP | 2001 132872 | 5/2001 |
| JP | 2001 323814 | 11/2001 |
| WO | 2010 103813 | 9/2010 |

OTHER PUBLICATIONS

International Search Report Issued May 17, 2011 in PCT/JP11/53576 Filed Feb. 18, 2011.
U.S. Appl. No. 13/699,425, filed Nov. 21, 2012, Sakae, et al.

* cited by examiner

*Primary Examiner* — Forrest M Phillips
(74) *Attorney, Agent, or Firm* — Oblon, Spivak, McClelland, Maier & Neustadt, L.L.P.

(57) ABSTRACT

An exhaust pipe including an inner tube for introducing exhaust gas, and an outer tube fitted on the inner tube. Projected portions obtained by radially inwardly projecting plural parts of the inner peripheral surface of the outer tube in the circumferential direction, and extending the same in the tube axis direction, are provided on the inner peripheral surface of the outer tube. A plurality of air chambers partitioned by the projected portions are formed between the outer peripheral surface of the inner tube and the inner peripheral surface of the outer tube, and an intermediate member is provided between the outer peripheral surface of the inner tube and the projected portions. In the exhaust pipe a sufficient noise reduction effect and a prevention effect for reduction of the temperature of an exhaust gas can be obtained even if the exhaust pipe is bent.

10 Claims, 6 Drawing Sheets (A)

(B)

(A)

(B)

(A)

(B)

(A)

(B)

EXHAUST PIPE

TECHNICAL FIELD

The present invention relates to an exhaust pipe that can be suitably adopted for an internal combustion engine such as an engine for an automobile and the like.

BACKGROUND ART

As an exhaust pipe introducing an exhaust gas to the vehicle body rear part from an engine for an automobile through a manifold, a double-layer metal pipe provided with a minute gap (10-150 μm) between an outer tube and an inner tube is proposed in the Patent literature 1 and the like.

The object of the double-layer metal pipe is to improve the noise reduction performance by damping vibration of the inner tube generated by vibration of the engine and pulsation of the exhaust gas pressure by the minute gap.

PRIOR-ART LITERATURE

Patent Literature

[Patent literature 1] Japanese Unexamined Patent Application Publication No. 112-180400

SUMMARY OF INVENTION

Technical Problems

The vehicle body rear side (bottom) of an automobile has a structure of a variety of unevenness patterns according to the vehicle kind. Accordingly, in mounting the exhaust pipe, it is required that the exhaust pipe is subjected to a bending work according to the individual vehicle kind taking the unevenness pattern of the vehicle body rear side into consideration. Even when the publicly known double-layer metal pipe described above whose gap between the outer tube and the inner tube is minute is applied to the exhaust pipe, it is required naturally to bend arbitrary locations in the axial direction toward various directions.

However, in the bending work, "elongation in the axial direction" may possibly occur on the outside of bending in the exhaust pipe. Also, on the inside of bending, "compression in the axial direction" occurs and wrinkles caused by buckling are generated. Accordingly, local contact of the inner peripheral surface of the outer tube and the outer peripheral surface of the inner tube frequently occurs due to such elongation and buckling. Needless to say, in such a contact part of the outer tube and the inner tube, vibration of the inner tube is transmitted to the outer tube directly, and noise comes to leak to the outside. That is, there was a problem that sufficient noise reduction performance could not be obtained.

On the other hand, recently, automobiles called low-pollution vehicles have been developed such as a hybrid car mounted with an electric motor for traveling also in addition to a gasoline engine and selecting them according to the traveling condition, a vehicle kind that stops an engine even when the vehicle stops for a short time waiting for a traffic signal, and the like. In these automobiles, because the working time of the gasoline engine is reduced, the exhaust gas temperature also tends to drop.

However, the effect of a catalytic device provided in the exhaust pipe is not great when the temperature of the exhaust gas (exhaust gas temperature) is not higher than a predetermined temperature. Accordingly, drop of the exhaust gas temperature caused deterioration of the capacity of the catalytic device, which was likely to become a serious problem for emission restrictions and environmental issues. However, in the double-layer metal pipe of the related arts described in the Patent literature 1 and the like, because the gap between the outer tube and the inner tube is minute, the action of preventing the drop of the exhaust gas temperature can hardly be expected. That is, it is obvious that the problem is not solved by any means even if the double-layer metal pipe is used for an exhaust pipe.

The present invention has been developed considering the situations described above, and its object is to provide an exhaust pipe easy in bending work and capable of securing a sufficient noise reduction effect and an effect of preventing drop of the exhaust gas temperature even when bending work is performed.

Solution to Problem

In order to achieve the object, the present invention took the following means.

That is, the exhaust pipe in relation with the present invention is an exhaust pipe including an inner tube that introduces an exhaust gas from an engine and an outer tube that externally fits on the inner tube, in which projecting portions that project inwardly in the radial direction and continue in the longitudinal direction are formed on the inner peripheral surface of the outer tube, multiple air chambers partitioned by the projecting portions are formed between the outer peripheral surface of the inner tube and the inner peripheral surface of the outer tube, and an intermediate member is provided between the outer peripheral surface of the inner tube and the projecting portions.

According to the exhaust pipe with such a constitution, because the air chambers (air layer) formed between the inner tube and the outer tube block transmission of the noise and heat from the inner tube toward the outer tube to the outside, the noise reduction action and the heat insulation action can be secured.

Also, because the intermediate member is provided in a gap (the air chambers) between the inner tube and the outer tube, the inner tube and the outer tube aren't directly in contact with each other, and the vibration of the inner tube is also prevented from being transmitted to the outer tube through the projecting portions.

It is preferable that the intermediate member is formed of a highly porous material that has elasticity and the intermediate member is provided so as to fill up the air chambers.

With this constitution, the air chambers become "chambers filled with a highly porous material that largely contains pores", and the noise reduction action and the heat insulation action can be secured more effectively. Also, because the intermediate member has elasticity, the vibration of the inner tube is surely prevented from being transmitted to the outer tube through the projecting portions.

It is preferable that the projecting portions are formed in positions corresponding to positions that come to the outside when the outer tube is bent.

With this constitution, the gap (the air chambers) between the inner tube and the outer tube is surely maintained by the projecting portions that come to the outside of bending when the exhaust pipe is bent.

Also, it is preferable that the projecting portions are not formed in positions corresponding to positions that oppose in the radial direction to positions that come to the outside when the outer tube is bent.

By disposing the projecting portions thus being related with the outside and inside of the bending curve in bending work, crushing deformation in the radial direction of the outer tube and the like comes to be securely prevented. Further, an effect of facilitating bending work is also secured.

It is preferable that the projecting portions are formed along a neutral axis in bending the outer tube.

With this constitution, misalignment in the longitudinal direction between the outer tube and the inner tube can be prevented in bending work, and the outer tube comes to be capable of surely holding the inner tube in the center part thereof.

Advantageous Effects of Invention

According to the exhaust pipe in relation with the present invention, even when the bending work is performed, sufficient noise reduction effect can be secured, and the effect of preventing drop of the exhaust gas temperature can be secured.

DESCRIPTION OF EMBODIMENTS

Below, embodiments of the present invention will be described referring to drawings.

Figure 1:
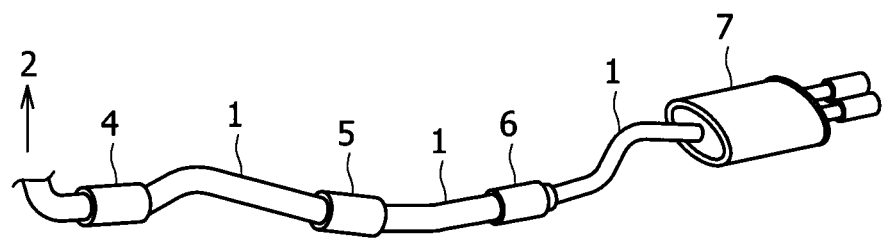
FIG. 1 is a perspective view showing a use example of an exhaust pipe in relation with the present invention.
Figure 2:
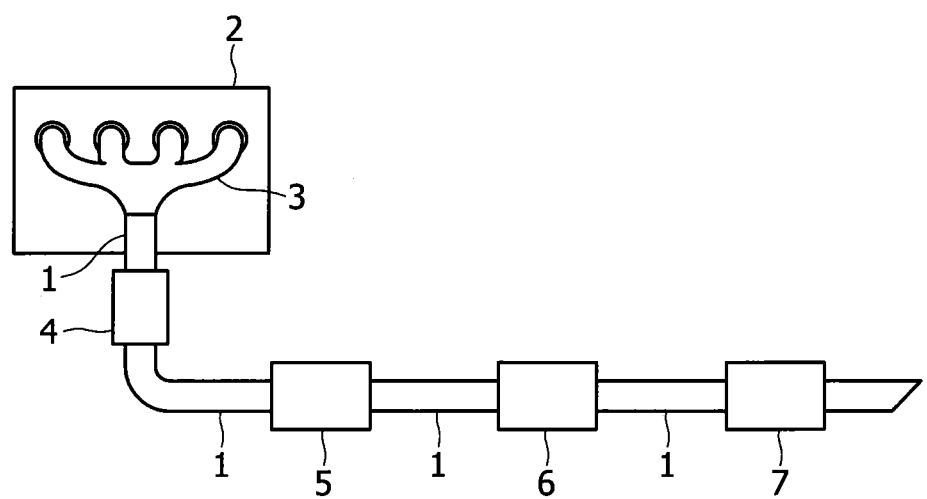
FIG. 2 is a schematic drawing showing a use example of an exhaust pipe in relation with the present invention.

As shown in FIG. 1 and FIG. 2, an exhaust pipe 1 in relation with the present invention is used for an internal combustion engine such as an engine 2 for an automobile and the like so as to connect catalytic devices 4, 5 and mufflers 6, 7 to each other through a manifold 3 and to introduce an exhaust gas discharged from the engine 2 to the vehicle body rear.

The length of the exhaust pipe 1 is changed variously according to the difference in the connection distance. Also, the exhaust pipe 1 is subjected to bending work toward various directions matching the unevenness patterns of the vehicle body rear side (bottom) according to the kind of the automobile.

Also, the catalytic devices 4, 5 remove hydrocarbon, carbon monoxide, nitrogen oxide and the like in the exhaust gas by oxidation and reduction. Further, the mufflers 6, 7 eliminate the sound by damping the vibration caused by the exhaust gas pressure. The use number, layout and the like of these catalytic devices 4, 5 and mufflers 6, 7 may be changed appropriately according to the displacement, type and the like of the engine 2. Connection of the exhaust pipes 1 to the catalytic devices 4, 5 and the mufflers 6, 7 and connection of the exhaust pipes 1 to each other are performed by welding and the like.

Also, in FIG. 1 and FIG. 2, all of the mutual connection of the catalytic devices 4, 5 and the mufflers 6, 7 is performed by the exhaust pipes 1 in relation with the present invention. However, the portion directly connected to the manifold 3 and the like for example is possibly disposed inside an engine room of the automobile, and therefore single pipes, double-layer metal pipes and the like of related arts can substitute.

First Embodiment

Figure 3:
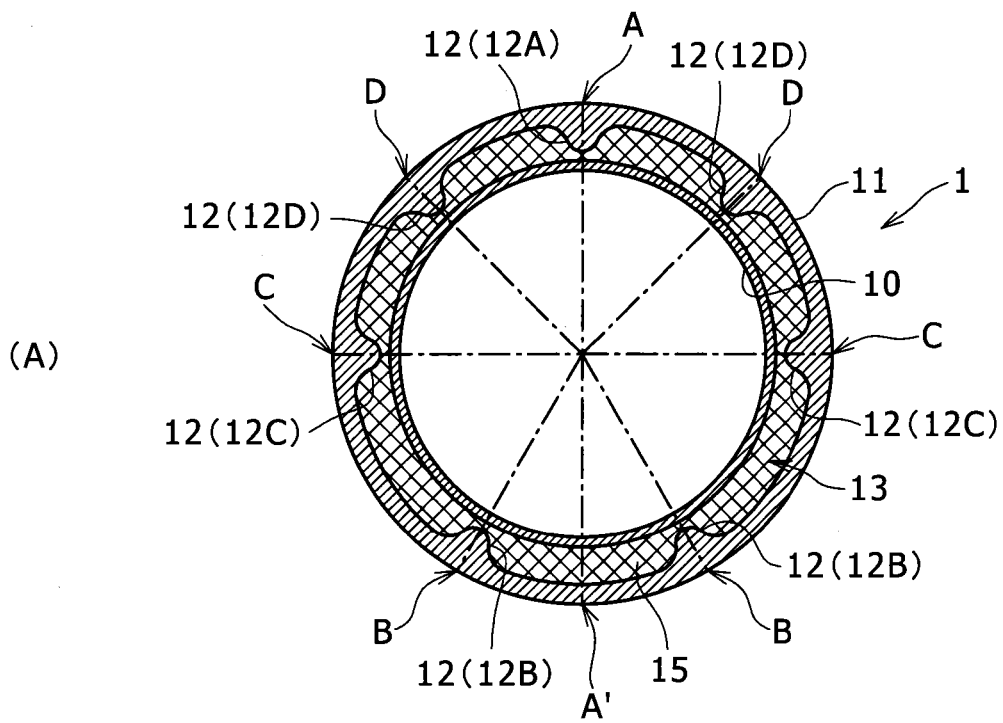
FIG. 3 (A) is a cross-sectional view showing a first embodiment of an exhaust pipe in relation with the present invention, and (B) is a cross-sectional view showing a modification of the first embodiment of an exhaust pipe in relation with the present invention.
Figure 3:
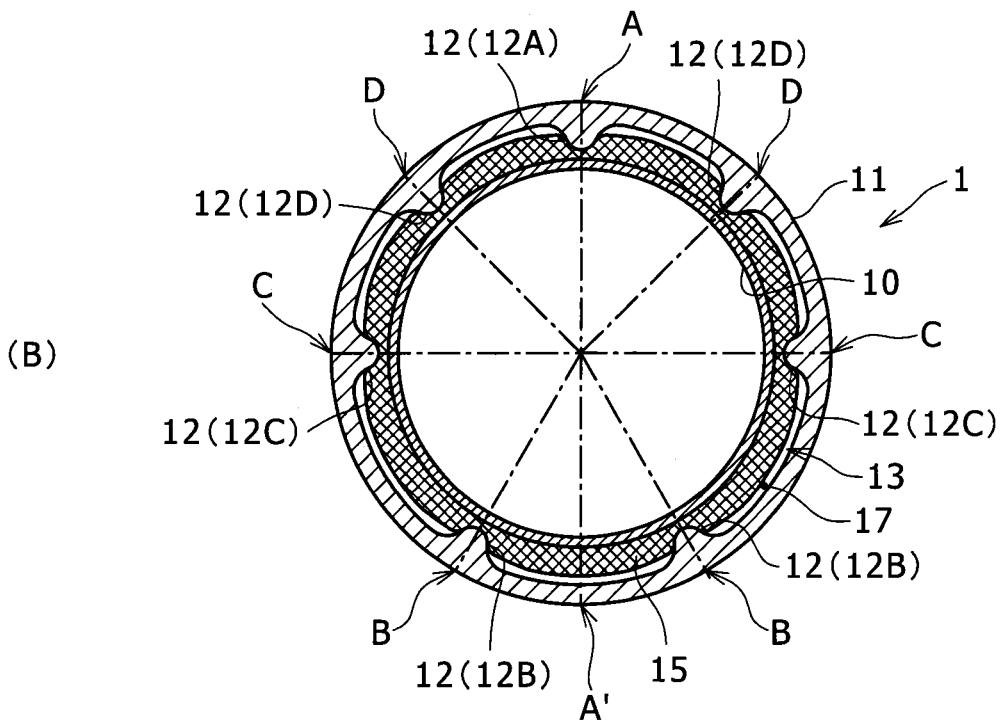

FIG. 3 (A) shows the first embodiment of the exhaust pipe 1 in relation with the present invention, and FIG. 3 (B) shows a modification of the first embodiment of the exhaust pipe 1 in relation with the present invention.

The exhaust pipe 1 includes an inner tube 10 that introduces an exhaust gas from the engine 2 and an outer tube 11 externally fit to the inner tube 10.

On the inner peripheral surface of the outer tube 11, projected portions 12 of seven numbers in a cross-sectional view are provided, and between the outer peripheral surface of the inner tube 10 and the inner peripheral surface of the outer tube 11, seven air chambers 13 (air layer) partitioned in the peripheral direction by the projected portions 12 are formed. The thickness (the dimension in the radial direction) of the air chambers 13 is approximately equal to the projection height (the dimension in the radial direction) of the projected portions 12.

Between the outer peripheral surface of the inner tube 10 and the tips of the projected portions 12, an intermediate member 15 is present in an embraced state. That is, the exhaust pipe 1 is of a three-layer structure by the inner tube 10, the intermediate member 15 and the outer tube 11. The air chambers 13 are either in a state perfectly filled by the intermediate member 15 (filled-up state) as shown in FIG. 3 (A), or in a state filled by the intermediate member 15 while leaving some gap (non-filled-up state) as shown in FIG. 3 (B).

Below, the detail of each member will be described.

The inner tube 10 is a long tube of a substantially circular shape in a cross-sectional view. The raw material of the inner tube 10 is selected out of raw materials excellent in heat resistance against the exhaust gas temperature, corrosion resistance against the substance included in the exhaust gas, and the mechanical strength against the external force of the exhaust gas vibration, traveling vibration and the like. In particular, a raw material is selected which is suitable in workability in bending, cutting and the like, economy in the raw material cost, weight reduction from the aspect of traveling performance, and the like. To be more precise, it is suitable that the inner tube 10 is formed of stainless steel.

The outer tube 11 is a long tube of a substantially circular shape in a cross-sectional view, and has a diameter capable of inserting the inner tube 10 thereinside.

Raw material of the outer tube 11 is selected out of raw material excellent in corrosion resistance against rain water, a snow melting agent and the like, and the mechanical strength against collision with small stones, friction against the mad surface and the like. In particular, raw material is selected which is suitable in formability in terms of integrally providing the projected portions 12, workability in bending, cutting and the like, economy in the raw material cost, weight reduction from the aspect of traveling performance, and the like. To be more precise, it is suitable that the outer tube 11 is formed of an extruded material such as aluminum, aluminum alloy and the like.

On the inner peripheral surface of the outer tube 11, the projected portions 12 of seven numbers in a cross-sectional view are provided.

The projected portions 12 project inwardly in the radial direction at several parts in the peripheral direction of the outer tube 11, and are formed continuously so as to extend over the entire length along the axial direction of the outer tube 11. The projected portions 12 are formed by being extruded integrally with the outer tube 11. The projected portions 12 are disposed so as to separate the inner peripheral surface of the outer tube 11 into seven in the peripheral direction. That is, seven projected portions 12 are provided in total.

As shown in FIG. 3, the pitch at which the projected portions 12 are disposed is not equal in the peripheral direction. In the drawings, the pitch is narrow on the upper side of the outer tube 11, and the pitch is wide on the lower side. Accordingly, the width in the peripheral direction of the air chamber 13 formed between the projected portions 12 adjacent to each other in the peripheral direction is narrow on the upper side in the drawing and wide on the lower side. All of the layer thickness (the dimension in the radial direction) of the air chambers 13 is formed into an equal dimension.

The cross-sectional shape of the projected portions 12 is an isosceles triangle shape with the side of the inner peripheral surface of the outer tube 11 being a base, and the apex angle part thereof is roundingly chamfered into a semicircle shape. Also, in the feet portions where the oblique lines of the isosceles triangle rise from the inner peripheral surface of the outer tube 11, the external angles thereof are also roundingly chamfered smoothly.

The projection height of the projected portions 12 is formed to be smaller than the layer thickness of the air chambers 13 so as to form a "gap" between the tips of the projected portions 12 and the outer peripheral surface of the inner tube 10. The intermediate member 15 is put into the gap.

In the meantime, as described above, the exhaust pipe 1 may be subjected to bending work in attaching to an automobile (refer to FIG. 1).

In FIG. 3, it is assumed that bending is performed so that the upper part of the outer tube 11 comes to the outside of bending (the outside of the curve and the side with a larger radius of curvature) and the lower part of the outer tube 11 comes to the inside of bending (the inside of the curve and the side with a smaller radius of curvature). Below, the importance of the layout in which seven projected portions 12 (12A-12D) are provided on the inner peripheral surface of the outer tube 11 will be described.

First, the projected portion 12A is disposed at a position A that comes to the outermost side of bending in the outer tube 11. The projected portion 12 is not provided at a position A' that is on the inside of bending and opposes the position A in the radial direction.

Also, projected portions 12C are formed at positions C that come to the middle of the outside of bending and the inside of bending (the horizontal direction position of the exhaust pipe 1; two locations), and projected portions 12D are formed at positions D (two locations) that come to the middle of the position A and the positions C.

In addition, projected portions 12B are formed at positions on both right and left sides of the position A' (positions B). The projected portions 12B, 12B are provided at positions equally dividing the lower half of the outer tube 11 (the position C in the right—the position C in the left) into three.

The functions of respective projected portions 12A-12D will be described below.

The projected portion 12A provided at the position A supports the inner tube 10 in bending. The supporting force of the projected portion 12A acts so as to prevent crushing of the outer tube 11 toward the radial direction by bending (to prevent crushing of the air chambers 13). On the other hand, at the position A' that opposes the position A in the radial direction, the projected portion 12 is not provided.

As described above, in bending work of the exhaust pipe 1, on the inside of bending of the exhaust pipe 1, "compression in the axial direction" occurs and wrinkles caused by buckling are generated. Because a space that allows generation of the wrinkles is indispensable, it is preferable that the projected portion 12 is not provided at the position A'. If the projected portion 12 is present at the position A' and strong compressive bending occurs at the part, buckling of thick thickness part occurs, the air chamber 13 crushes, and the outer tube 11 and the inner tube 10 are brought in contact with each other, which are not preferable.

Also, when the exhaust pipe 1 is bent, on the inside of bending of the outer tube 11 (particularly between the projected portion 12B—the projected portion 12B), the recess and overhanging directed to the inside and outside in the radial direction of the outer tube 11 and the wrinkles along the peripheral direction may possibly be generated. In order to prevent such deformation of the outer tube 11 from reaching the inner tube 10, it is preferable that the projected portions 12B, 12B are disposed so as to be close to each other as much as possible in the right and left vicinity of the position A'.

The projected portions 12C are provided at the positions C corresponding to the positions not affected by elongation in the axial direction and compression in the axial direction that accompany bending of the exhaust pipe 1 (on the neutral axis). Accordingly, misalignment in the longitudinal direction of the projected portions 12 of the outer tube 11 and the inner tube 10 in bending work can be prevented, and the outer tube 11 comes to be capable of surely holding the inner tube 10 at the center part thereof.

The other projected portions 12B and the projected portions 12D act so as to surely hold the inner tube 10 at the center part of the outer tube 11 and to suppress crushing of the air chambers 13 due to bending as much as possible.

Thus, because the projected portion 12A-projected portions 12D are disposed at the position A—the positions D, even when the exhaust pipe 1 is subjected to bending work, between the outer peripheral surface of the inner tube 10 and the inner peripheral surface of the outer tube 11, the air chambers 13 are secured over almost entire periphery excepting the projected portions 12.

Also, it is preferable that the outer peripheral surface of the outer tube 11 is marked with an indication (an indication by a solid line, chain line and the like for example) corresponding to all of the projected portions 12 or any projected portion 12. Thereby, in bending the exhaust pipe 1, it comes to be easily and surely allowed to bend and outwardly direct the projected portion 12A at the first position A in the outer tube 11 and to bend and inwardly direct the projected portions 12B at the second positions B.

Further, with respect to the bending work of the exhaust pipe 1, there is a case that not only two-dimensional bending by once but also bending by plural times in different directions are included, and there is a case that three-dimensional bending (bending in the oblique direction, curved bending and the like) is included. In such cases, the exhaust pipe 1 can be bent so that the exhaust pipe 1 is twisted around the axis thereof while making the indication marked on the outer peripheral surface of the outer tube 11 as an aim and the indication marked on the outer peripheral surface of the outer tube 11 and the bending direction generally agree to each other.

In the meantime, the intermediate member 15 disposed between the inner tube 10 and the outer tube 11 is an elastic member having pores, and is formed of a highly porous material capable of holding air chambers thereinside. Needless to say, the intermediate member 15 is required to have heat resistance against the heated temperature of the inner tube 10 (exhaust gas temperature) and to be excellent in corrosion resistance against moisture and the like. To be more precise, it is suitable to use glass wool and ceramic wool.

Also, the intermediate member 15 only has to be provided at least between the outer peripheral surface of the inner tube 10 and the tips of the projected portions 12, and may be provided only at the parts. However, practically, the intermediate member 15 is provided over the entire periphery between the inner tube 10 and the outer tube 11. To thus provide the intermediate member 15 over the entire periphery is beneficial in terms of improving heat retaining property between the inner tube 10 and the outer tube 11. In FIG. 3 (A), the intermediate member 15 is arranged so as to fill up the air chambers 13 (filled-up state), and the heat retaining property thereof is improved at a maximum.

However, arrangement of the intermediate member 15 is not limited to it. As a modification shown in FIG. 3 (B), the intermediate member 15 may be arranged so that gaps 17 are formed between the inner peripheral surface of the outer tube 11 and the intermediate member 15 at the locations other than the projected portions 12 (non-filled-up state).

As is clear from the description above, because the air chambers 13 formed between the inner tube 10 and the outer tube 11 block transmission of the noise and heat from the inner tube 10 toward the outer tube 11, the exhaust pipe 1 in relation with the present invention has the noise reduction action and the heat retaining action. Accordingly, the effect of suppressing the noise of the exhaust gas and the effect of preventing deterioration of the capacity of the catalytic devices 4, 5 can be secured.

Also, when the exhaust pipe 1 is bent so that the projected portion 12 (the projected portion 12A in particular) provided on the inner peripheral surface of the outer tube 11 comes to the outside of bending, the air chambers 13 between the inner tube 10 and the outer tube 11 is secured by the projected portion 12A without being deformed and crushed.

Further, because the intermediate member 15 having elasticity is put into the gap between the outer peripheral surface of the inner tube 10 and the projected portions 12, vibration of the inner tube 10 is also prevented from being transmitted to the outer tube 11 through the projected portions 12.

Based on the above, even when the exhaust pipe 1 in relation with the present invention is bent, the noise reduction action and the heat retaining action by the air chambers 13 where the intermediate member 15 is present is surely secured. Accordingly, both of the effect of lowering the noise of the exhaust gas and the effect of purifying the exhaust gas by the catalytic device and limiting it within the restricted range come to be surely secured.

Also, the method for manufacturing the exhaust pipe 1 of the present invention is not particularly limited, and any method can be applied. The exhaust pipe 1 may be manufactured by inserting the inner tube 10 around which the intermediate member 15 is wound into the outer tube 11 and die-drawing the pipe material that is made a three-layer structure.

Second Embodiment

Figure 4:
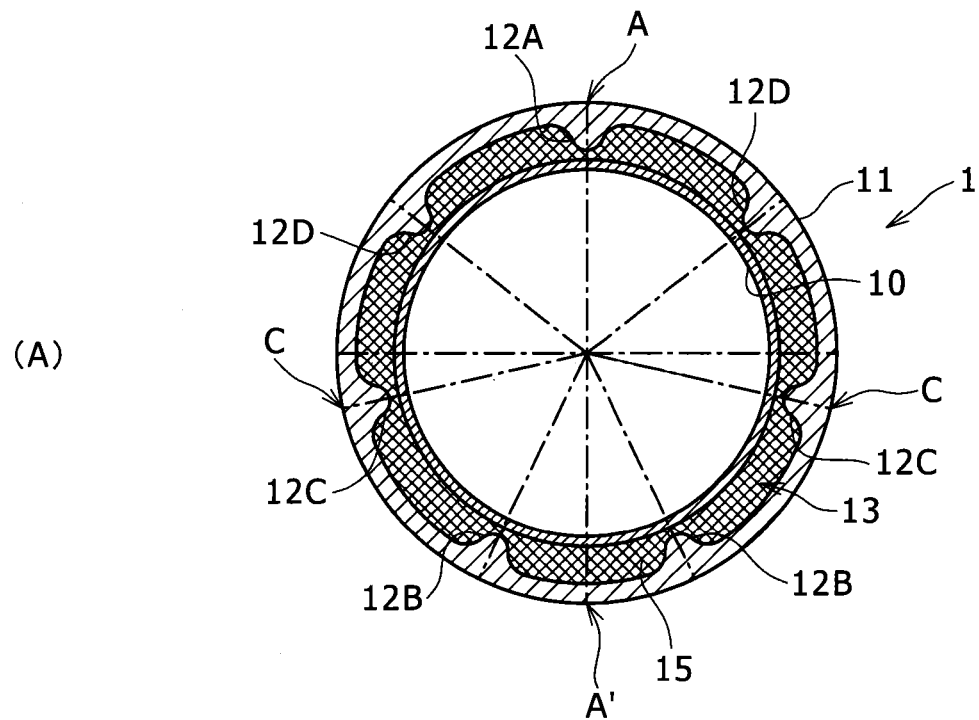
FIG. 4 (A) is a cross-sectional view showing a second embodiment of an exhaust pipe in relation with the present invention, and (B) is a cross-sectional view showing a modification of the second embodiment of an exhaust pipe in relation with the present invention.
Figure 4:
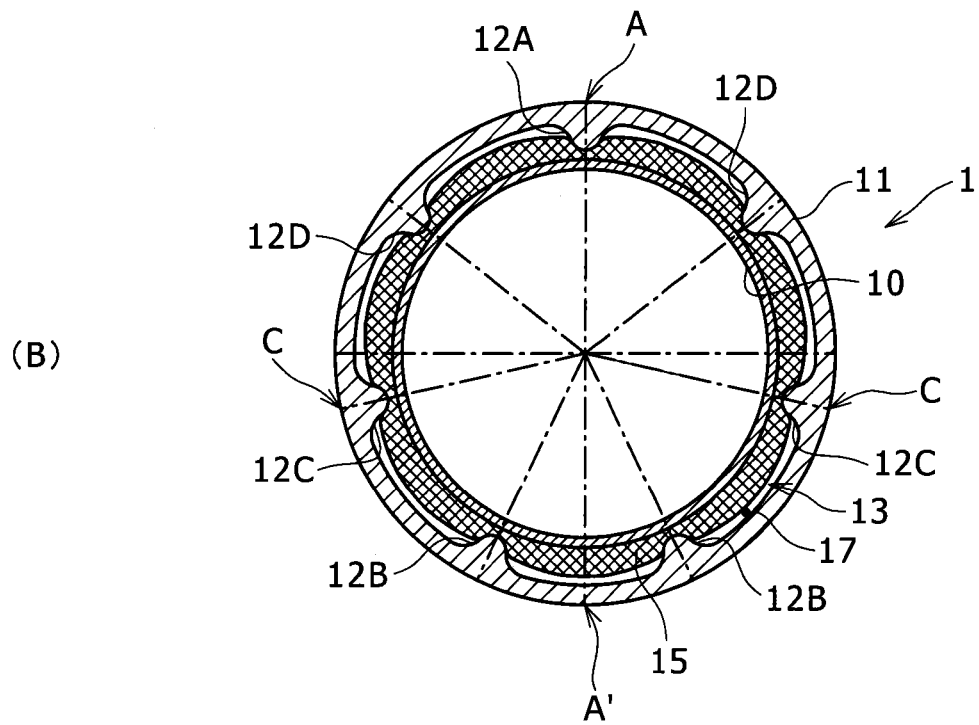

FIG. 4 (A) shows the second embodiment of the exhaust pipe 1 in relation with the present invention, and FIG. 4 (B) shows a modification of the second embodiment of the exhaust pipe 1 in relation with the present invention.

The exhaust pipe 1 of the second embodiment is similar to that of the first embodiment in terms that the projected portions 12 of seven numbers in a cross-sectional view are provided on the inner peripheral surface of the outer tube 11 thereof and that seven air chambers 13 partitioned by the projected portions 12 are formed on the outer peripheral surface of the inner tube 10.

However, the exhaust pipe 1 of the second embodiment is different from that of the first embodiment in terms that seven projected portions 12 are disposed equally (at equal intervals) in the peripheral direction (in the first embodiment, the projected portions 12 are disposed at unequal intervals in the peripheral direction).

The projected portion 12A is formed at the position A that comes to the outside of bending on the inner surface of the outer tube 11. The remaining six projected portions 12 are disposed at equal intervals in the peripheral direction with the projected portion 12A being a starting point. Accordingly, the projected portions 12C corresponding to the positions C come to be positioned slightly on the lower side of the horizontal direction diameter position of the outer tube 11 and is positioned slightly on the lower side of the neutral line of bending.

Even in the exhaust pipe 1 in which the projected portions 12 are thus disposed, when the projected portion 12A provided on the inner peripheral surface of the outer tube 11 comes to the outside of bending, the air chambers 13 between the inner tube 10 and the outer tube 11 are secured by the projected portion 12A without being deformed and crushed. In addition, the exhaust pipe 1 of the second embodiment is capable of flexibly responding to three-dimensional bending (bending in oblique direction, curved bending and the like).

Other constitutions of the second embodiment are generally the same to those of the first embodiment, and detailed description here will be omitted by marking identical reference signs for those having the same actions respectively.

In the meantime, in the second embodiment also, the intermediate member 15 may be disposed so as to be a filled-up state as shown in FIG. 4(A), or may be disposed also so as to be a non-filled-up state as a modification shown in FIG. 4(B).

Third Embodiment

Figure 5:
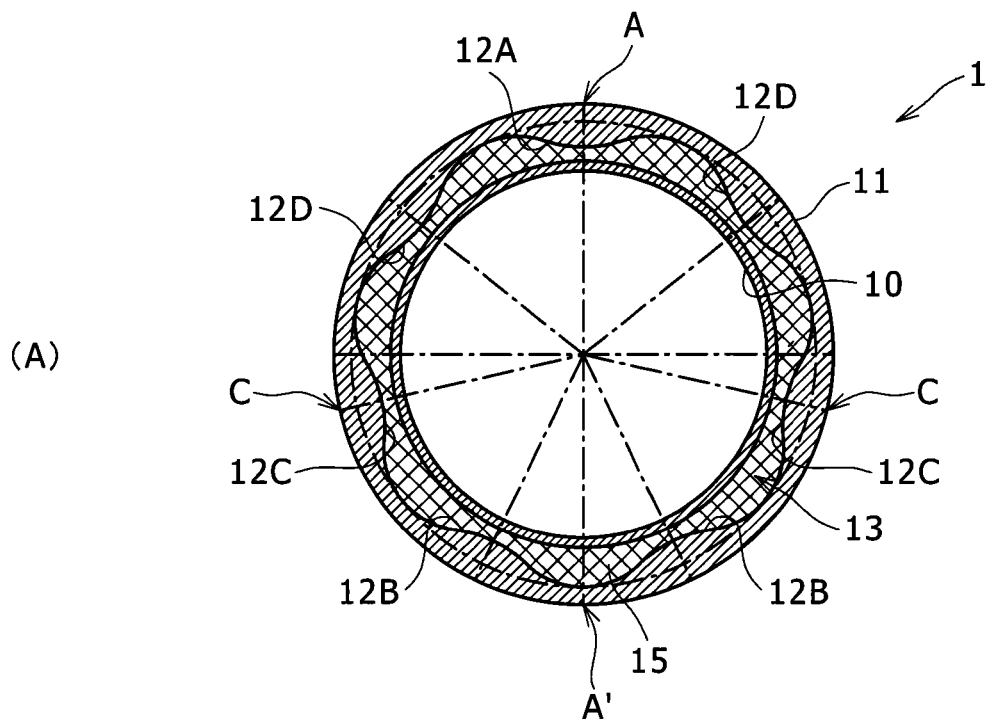
FIG. 5 (A) is a cross-sectional view showing a third embodiment of an exhaust pipe in relation with the present invention, and (B) is a cross-sectional view showing a modification of the third embodiment of an exhaust pipe in relation with the present invention.
Figure 5:
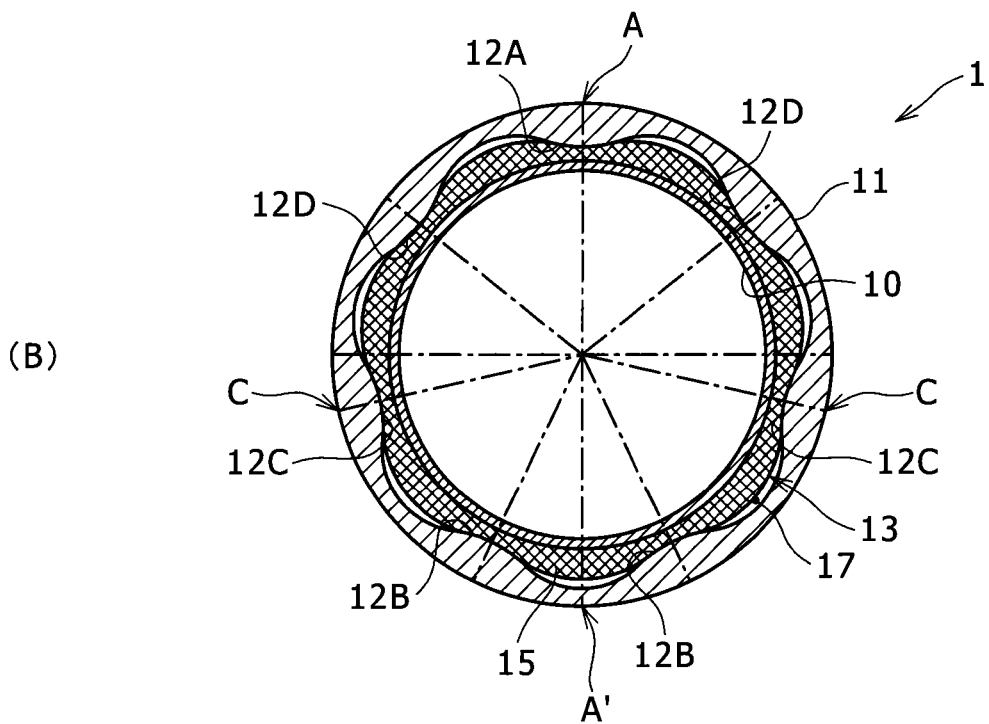

FIG. 5 (A) shows the third embodiment of the exhaust pipe 1 in relation with the present invention, and FIG. 5 (B) shows a modification of the third embodiment of the exhaust pipe 1 in relation with the present invention.

The exhaust pipe 1 of the third embodiment is similar to that of the second embodiment in terms that the projected portions 12 of seven numbers in a cross-sectional view are provided on the inner peripheral surface of the outer tube 11 thereof and that seven air chambers 13 partitioned by the projected portions 12 are formed on the outer peripheral surface of the inner tube 10.

However, the exhaust pipe 1 of the third embodiment is different from that of the second embodiment in terms that the cross-sectional shape of each projected portion 12 is a "wave-like shape" in the projected portions 12 adjacent to each other in the peripheral direction (in the second embodiment, the projected portion 12 is in an isosceles triangle shape with the side of the inner peripheral surface of the outer tube 11 being a base).

In the present embodiment also, the projected portion 12A is formed at the position A that comes to the outside of bending of the exhaust pipe 1. The remaining six projected portions 12 are disposed at equal intervals in the peripheral direction with the projected portion 12A being a starting point. Accordingly, the projected portions 12C corresponding to the positions C come to be positioned slightly on the lower side of the horizontal direction diameter position of the outer tube 11 and come to be positioned slightly on the lower side of the neutral line of bending.

Even in the exhaust pipe 1 in which the projected portions 12 are thus disposed, when the projected portion 12A provided on the inner peripheral surface of the outer tube 11 comes to the outside of bending, the air chambers 13 between the inner tube 10 and the outer tube 11 is secured by the projected portion 12A without being deformed and crushed. In addition, the exhaust pipe 1 of the third embodiment is capable of flexibly responding to three-dimensional bending (bending in oblique direction, curved bending and the like).

Other constitutions of the third embodiment are generally the same to those of the second embodiment, and detailed description here will be omitted by marking identical reference signs for those having the same actions respectively.

In the third embodiment also, the intermediate member 15 may be disposed so as to be a filled-up state as shown in FIG. 5 (A), or may be disposed also so as to be a non-filled-up state as a modification shown in FIG. 5 (B).

Fourth Embodiment

Figure 6:
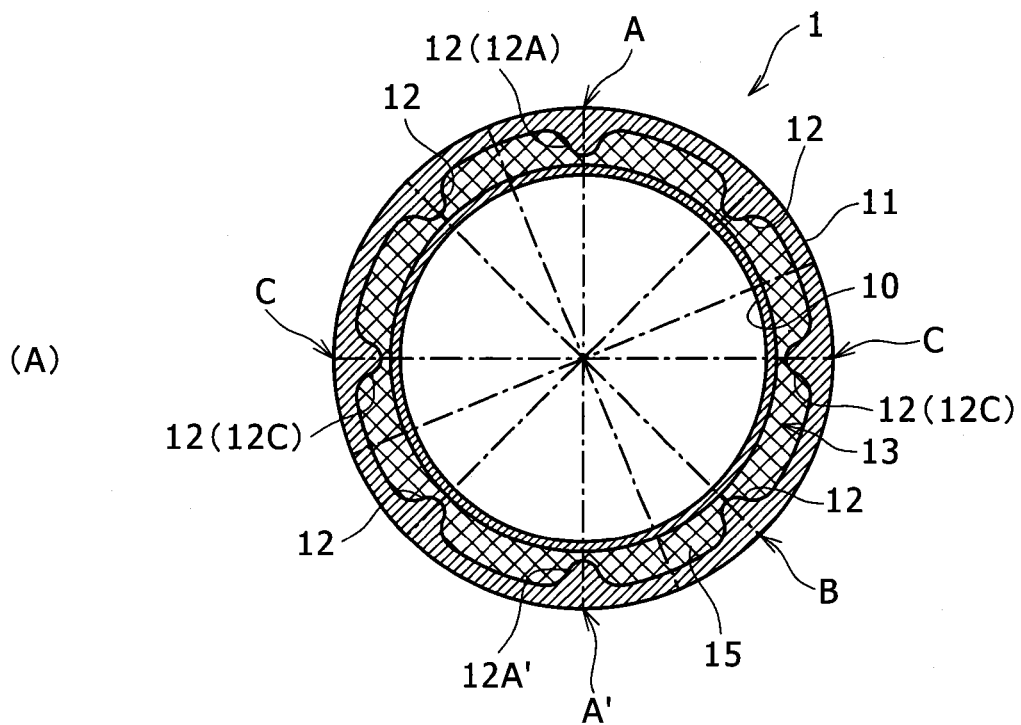
FIG. 6 (A) is a cross-sectional view showing a fourth embodiment of an exhaust pipe in relation with the present invention, and (B) is a cross-sectional view showing a modification of the fourth embodiment of an exhaust pipe in relation with the present invention.
Figure 6:
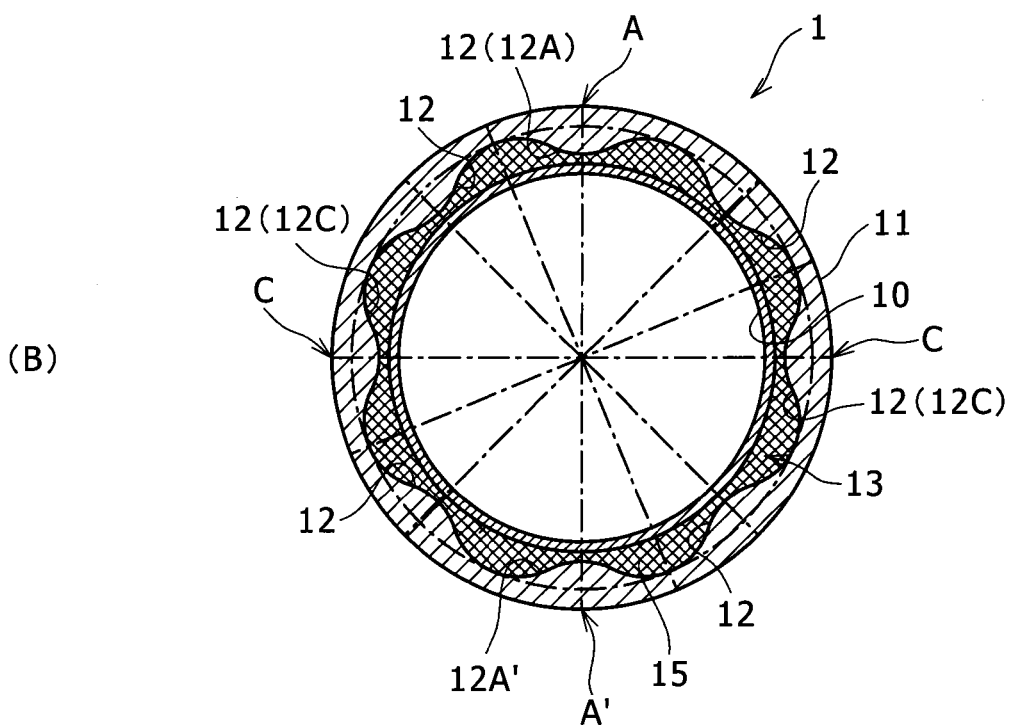

FIG. 6 (A) shows the fourth embodiment of the exhaust pipe 1 in relation with the present invention, and FIG. 6 (B) shows a modification of the fourth embodiment of the exhaust pipe 1 in relation with the present invention.

In the fourth embodiment, the projected portions 12 are disposed at the positions equally dividing the inner peripheral surface of the outer tube 11 into eight, and eight projected portions 12 are provided in total.

The example shown in FIG. 6 (A) is similar to the first embodiment (refer to FIG. 3 (A), (B)) and the second embodiment (refer to FIG. 4 (A), (B)) in terms that the cross-sectional shape of the projected portions 12 is an isosceles triangle shape whose apex part is rounded.

Also, the modification shown in FIG. 6 (B) is similar to the third embodiment (refer to FIG. 5) in terms that the cross-sectional shape of the projected portions 12 is a wave-like shape.

When the number of the projected portions 12 formed thus increases, the intervals in the peripheral direction of the projected portions 12 become narrow. Also, similarly to the first embodiment, the projected portion 12A is disposed at the first position A, and the projected portions 12C are disposed at the third positions C (the positions corresponding to the neutral axis). Furthermore, in the fourth embodiment, the projected portion 12A' is also disposed at the position A'. Because the projected portions 12 are disposed at thus equal intervals, even when such work as bending the exhaust pipe 1 is subjected to, the air chambers 13 between the inner tube 10 and the outer tube 11 are secured without being deformed and crushed. In addition, the exhaust pipe 1 of the third embodiment is capable of flexibly responding to three-dimensional bending (bending in oblique direction, curved bending and the like).

Further, although illustration is omitted, in the fourth embodiment also, the intermediate member 15 may be disposed so as to be a filled-up state, or may be disposed also so as to be a non-filled-up state.

Fifth Embodiment

Figure 7:
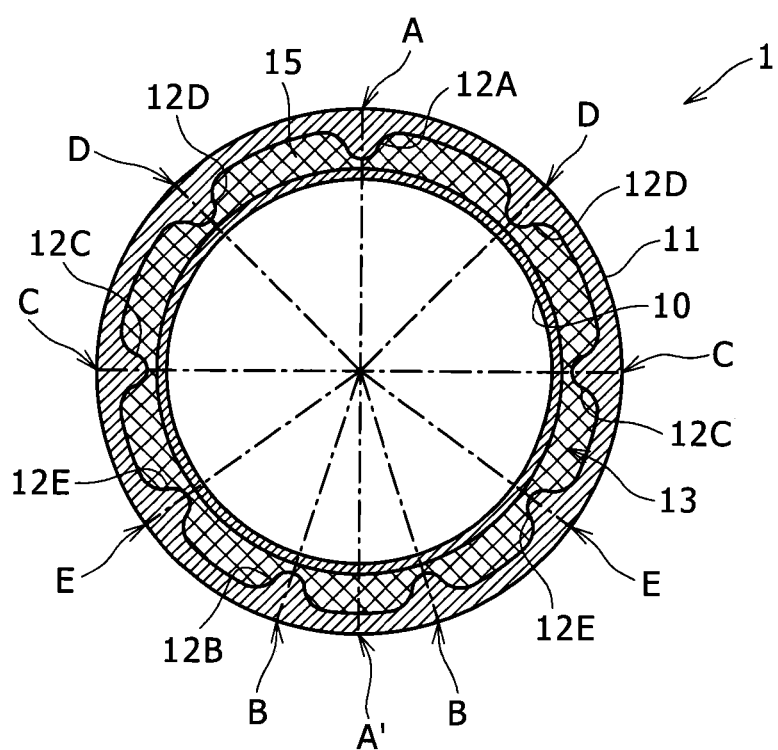
FIG. 7 is a cross-sectional view showing a fifth embodiment of an exhaust pipe in relation with the present invention.

FIG. 7 shows the fifth embodiment of the exhaust pipe 1 in relation with the present invention.

The fifth embodiment is a modification of the first embodiment, the number of the projected portions 12 formed is increased further, and nine projected portions 12 are provided in total at unequal intervals in the peripheral direction.

First, the projected portion 12A is provided at the position A (one location) that comes to the outside of bending in the outer tube 11, and the projected portion 12 is not provided at the position A' that is on the inside of bending and opposes the position A in the radial direction. Also, the projected portions 12C are provided at the positions C (two locations) that correspond to the neutral axis in bending the exhaust pipe 1.

In addition, the projected portions 12D are disposed at positions D (two locations) that come to the middle in the peripheral direction of the position A and the positions C. Furthermore, the projected portions 12B or the projected portions 12E are disposed respectively at positions B (two locations) and positions E (two locations) that are decided by equally dividing the interval between the positions C at two locations in the horizontal direction into five.

Other constitutions of the fifth embodiment are generally the same to those of the first embodiment, and detailed description here will be omitted by marking identical reference signs for those having the same actions respectively.

In the fifth embodiment also, the intermediate member 15 may be disposed so as to be a filled-up state as shown in FIG. 7, or may be disposed also so as to be a non-filled-up state although it is not illustrated.

In the meantime, the embodiments herein disclosed are to be regarded to be exemplifications and not to be restrictive in all aspects. The scope of the present invention is expressed not by the descriptions above but by the claims of the patent which are intended to include all alterations within the implication and scope the same to those of the claims of the patent.

For example, the number of the projected portions 12 formed is not limited to seven, eight and nine as described above, and can be changed appropriately. For example, the number of the projected portions 12 formed may be five, six, or ten or more.

The cross-sectional shape of the projected portions 12 can be changed to a variety of shapes such as a square shape, rectangular shape, trapezoidal shape, and the like. Also, it is not necessary the cross-sectional shapes of all the projected portions 12 are to be the same to each other.

Further, the exhaust pipe 1 in relation with the present invention is not limited to be applied to an engine (Internal combustion engine) of an automobile, but can be adopted also in an internal combustion engine and the like for agricultural work machines, marine vessels and the like.

In the meantime, whether the projected portion 12 is not disposed at the position A' as in the first embodiment or whether the projected portion 12 is disposed at the position A' as in the fourth embodiment can be selected appropriately according to bending situation of the exhaust pipe 1. For example, when the bend of the exhaust pipe 1 is large (larger than 90° for example), the projected portion 12 is preferable to be provided at the position A' as in the fourth embodiment. Also, when the bend of the exhaust pipe 1 is not so large (90° or less for example), the projected portion 12 is not preferable to be provided at the position A' as in the first embodiment.

The embodiments and examples of the present invention have been described above, however the present invention is not limited to the embodiments described above, and a variety of alterations can be executed to the extent described in the claims of the invention. The present application is based on Japanese Patent Application applied on Feb. 23, 2010 (Japanese Patent Application No. 2010-037559), and the contents thereof are hereby incorporated by reference.

REFERENCE SIGNS LIST

1: Exhaust pipe
10: Inner tube
11: Outer tube
12 (12A-12E): Projected portion
13: Air chamber
15: Intermediate member

The invention claimed is:

1. An exhaust pipe, comprising:
   an inner tube that introduces an exhaust gas from an engine; and
   an outer tube that externally fits on the inner tube, wherein
   projecting portions that project inwardly in the radial direction and extend in the longitudinal direction are formed on the inner peripheral surface of the outer tube wherein the projecting portions do not contact the inner tube;
   a plurality of air chambers partitioned by the projecting portions are formed between the outer peripheral surface of the inner tube and the inner peripheral surface of the outer tube; and
   an intermediate member is provided between the outer peripheral surface of the inner tube and the projecting portions.

2. The exhaust pipe according to claim 1, wherein
   the intermediate member is formed of a highly porous material that has elasticity; and
   the intermediate member is provided so as to fill up the air chambers.

3. The exhaust pipe according to claim 1, wherein
   the projecting portions are formed in positions corresponding to positions that come to be at the outside when the outer tube is bent.

4. The exhaust pipe according to claim 3, wherein
   the projecting portions are not formed in positions corresponding to positions that oppose in the radial direction to positions that come to be at the outside when the outer tube is bent.

5. The exhaust pipe according to claim 1, wherein
   the projecting portions are formed along a neutral axis in bending the outer tube.

6. The exhaust pipe according to claim 2, wherein
   the projecting portions are formed in positions corresponding to positions that come to be at the outside when the outer tube is bent.

7. The exhaust pipe according to claim 6, wherein
   the projecting portions are not formed in positions corresponding to positions that oppose in the radial direction to positions that come to be at the outside when the outer tube is bent.

8. The exhaust pipe according to claim 2, wherein
   the projecting portions are formed along a neutral axis in bending the outer tube.

9. The exhaust pipe according to claim 1, wherein the projection portions are provided over an angular range of the inner peripheral surface of the outer tube which is greater than one half of the circumference of the inner peripheral surface of the outer tube.

10. The exhaust pipe according to claim 3, wherein
    one of the projecting portions is formed at a position corresponding a most outside position relative to the bend when the outer tube is bent, and
    further comprising an external marking on the outer peripheral surface of the outer tube at the circumferential location of the one of the projecting portions.

* * * * *